United States Patent
Gu et al.

(10) Patent No.: US 9,529,623 B2
(45) Date of Patent: Dec. 27, 2016

(54) METHOD, MIGRATION MANAGEMENT APPARATUS, NETWORK DEVICE, AND VIRTUAL MACHINE SERVER FOR MIGRATING VIRTUAL MACHINE PARAMETERS

(71) Applicant: Huawei Technologies Co., LTD, Shenzhen (CN)

(72) Inventors: Yingjie Gu, Shenzhen (CN); Wei Song, Nanjing (CN); Xingfeng Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 14/018,170

(22) Filed: Sep. 4, 2013

(65) Prior Publication Data

US 2014/0007100 A1    Jan. 2, 2014

Related U.S. Application Data

(63) Continuation of application No. PCT/CN2011/083001, filed on Nov. 26, 2011.

(30) Foreign Application Priority Data

Mar. 24, 2011 (CN) .......................... 2011 1 0071982

(51) Int. Cl.
*G06F 9/455* (2006.01)
*G06F 9/46* (2006.01)
(Continued)

(52) U.S. Cl.
CPC ......... *G06F 9/4856* (2013.01); *G06F 9/44505* (2013.01); *G06F 9/45533* (2013.01);
(Continued)

(58) Field of Classification Search
None
See application file for complete search history.

(56) References Cited

U.S. PATENT DOCUMENTS

| | | | |
|---|---|---|---|
| 7,484,208 B1 | 1/2009 | Nelson | |
| 2009/0007106 A1 | 1/2009 | Araujo, Jr. et al. | |

(Continued)

FOREIGN PATENT DOCUMENTS

| | | |
|---|---|---|
| CN | 101101562 A | 1/2008 |
| CN | 101398768 A | 4/2009 |
| WO | 2007001675 A1 | 1/2007 |

OTHER PUBLICATIONS

IEEE Standards Department, "Draft Standard for Local and Metropolitan Area Networks, Virtual Bridged Local Area Networks—Amendment: Bridge Port Extension," IEEE P802.1Qbh/D0.4, Aug. 23, 2010, 86 pages.

(Continued)

*Primary Examiner* — Wissam Rashid
(74) *Attorney, Agent, or Firm* — Slater Matsil, LLP

(57) ABSTRACT

The present invention provides a method and an apparatus for migrating virtual machine parameters and a virtual machine server. The method includes receiving a virtual machine parameter migration message at a not-running stage of a virtual machine, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine. The present invention may implement migration of the virtual machine parameters correctly and solve a service interruption problem in virtual machine migration.

13 Claims, 3 Drawing Sheets

(51) Int. Cl.
*G06F 9/48* (2006.01)
*G06F 9/445* (2006.01)
*G06F 9/50* (2006.01)

(52) U.S. Cl.
CPC ........ *G06F 9/45558* (2013.01); *G06F 9/5077* (2013.01); *G06F 2009/4557* (2013.01)

(56) References Cited

U.S. PATENT DOCUMENTS

| 2010/0242045 A1* | 9/2010 | Swamy | G06F 9/455 718/104 |
| 2010/0332820 A1* | 12/2010 | Matsushima | G06F 21/10 713/150 |

OTHER PUBLICATIONS

IEEE Standards Activities Department, "Draft Standard for Local and Metropolitan Area Networks, Virtual Bridged Local Area Networks—Amendment XX: Edge Virtual Bridging," IEEE P802.1Qbg/D1.2, Oct. 21, 2010, 83 pages.
International Search Report received in Application No. PCT/CN2011/083001, mailed Feb. 23, 2012, 12 pages.
Extended European Search Report received in Application No. 11861435.3-1954, mailed Feb. 7, 2014, 8 pages.
Recio, Renato et al., "Ethernet Virtual Bridging Automation Use Cases," 22nd International Teletraffic Congress, Amsterdam, The Netherlands, Sep. 7-9, 2010, 10 pages.
Li, Yizhou et al., "Migration Indicator on VDP Req," IEEE-SA, Piscataway, NJ, vol. 802.1, No. v01, Jan. 13, 2011, 8 pages.

* cited by examiner

METHOD, MIGRATION MANAGEMENT APPARATUS, NETWORK DEVICE, AND VIRTUAL MACHINE SERVER FOR MIGRATING VIRTUAL MACHINE PARAMETERS

CROSS-REFERENCE TO RELATED APPLICATIONS

This application is a continuation of International Application No. PCT/CN2011/083001, filed on Nov. 26, 2011, which claims priority to Chinese Patent Application No. 201110071982.X, filed on Mar. 24, 2011, both of which are hereby incorporated herein by reference in their entireties.

TECHNICAL FIELD

The present invention relates to the network communications field, and in particular, to a method and apparatus for migrating virtual machine parameters and a virtual machine server.

BACKGROUND

Server virtualization is a technology that abstracts physical resources of a server into logical resources, and allows one server to become multiple independent virtual servers, or allows several servers to be used as one server. Server virtualization is no longer limited to a physical boundary; instead, hardware is changed into a dynamically manageable resource pool. Thereby, resource utilization is increased, system management is simplified, and server integration is implemented.

Normally, server virtualization is implemented in a manner of virtualizing a server into a virtual machine (VM). A virtual machine is a complete computer system simulated by software. It has complete hardware system functions and runs in a completely isolated environment. In some cases, a virtual machine migration technology needs to be applied. The virtual machine migration technology may instantly migrate a whole running virtual machine from one server to another server by using complete virtualization of a server, storage, and network connection.

An important requirement of virtual machine migration is that services should not be interrupted. For this purpose, before virtual machine migration is completed, corresponding virtual machine parameters needs to be configured on a server at an in-migration location of the virtual machine, namely, a destination server, and an upstream network device of the destination server. The virtual machine parameters may include static configurations and dynamic information. Static configurations are virtual machine parameters that do not change dynamically with time. These configurations are not time-sensitive, and services running on the VM may not be affected so long as the configurations are completed before the VM migration is completed. In addition to the static configurations, some dynamic information is generated on an upstream network device of the virtual machine according to a network traffic volume or state. The dynamic information refers to virtual machine parameters that may change dynamically with time. For example, a firewall or a device having a firewall function may store a transmission control protocol (TCP) connection table for describing necessary information of a TCP connection, such as a source Internet protocol (IP) address and a destination IP address, a source port and a destination port, a connection state, and a current sequence number. For another example, an upstream network device that enables a dynamic host configuration protocol (DHCP) snooping function needs to have a DHCP snooping table, and some upstream network devices may further store accumulative data, such as the number of TCP connections already established by a VM and the number of packets sent by the VM. The dynamic information cannot be configured in advance. However, if the dynamic information is not configured correctly, services running on the VM may be directly affected. For example, if the firewall lacks a TCP connection table, packets of services running on the VM may be discarded by the firewall.

Normally, when the virtual machine is migrated, only static configurations of the virtual machine parameters are migrated, and dynamic information is reacquired by the upstream network device of the virtual machine after the virtual machine is migrated. Before the dynamic information is reacquired, services on the virtual machine may be interrupted.

SUMMARY OF THE INVENTION

The purpose of the present invention is to provide a method and apparatus for migrating virtual machine parameters and a virtual machine server, so as to solve a service interruption problem in virtual machine migration.

In a first aspect, the present invention provides a method for migrating virtual machine parameters. The method includes receiving a virtual machine parameter migration message at a not-running stage of a virtual machine, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

In a second aspect, the present invention provides another method for migrating virtual machine parameters. The method includes sending a virtual machine parameter migration message at a not-running stage of a virtual machine, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

In a third aspect, the present invention provides a migration management apparatus including a receiving unit and a migrating unit. The receiving unit is configured to receive a virtual machine parameter migration message at a not-running stage of a virtual machine, where the virtual machine parameter migration message is used to cause an upstream network device of the virtual machine to migrate virtual machine parameters of the virtual machine at a not-running stage of the virtual machine, and the virtual machine parameter migration message includes an identifier of the virtual machine. The migrating unit is configured to migrate virtual machine parameters according to the virtual machine parameter migration message.

In a fourth aspect, the present invention provides a network device located on an upstream path of a virtual machine, and including a receiving unit and a migrating unit. The receiving unit is configured to receive a virtual machine parameter migration message at a not-running stage of a virtual machine, where the virtual machine parameter migration message includes an identifier of the virtual machine and a virtual machine parameter migration indication, where the virtual machine parameter migration indication is used to instruct an upstream network device of the virtual machine to migrate virtual machine parameters at a not-running stage of the virtual machine and used to indicate a migration state of the virtual machine, and where the migration state includes in-migration and out-migration. The migrating unit is configured to migrate virtual machine parameters according to the virtual machine parameter migration message.

In a fifth aspect, the present invention provides a virtual machine server including a triggering unit and a sending unit. The triggering unit is configured to trigger, at a not-running stage of a virtual machine, the sending unit to send a virtual machine parameter migration message. The sending unit is configured to send the virtual machine parameter migration message, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

According to the technical solutions provided by the present invention, because at the not-running stage of the virtual machine, the virtual machine to be migrated does not provide services, and dynamic information in corresponding virtual machine parameters on the upstream network device of the virtual machine does not change, the upstream network device of the virtual machine migrates the virtual machine parameters of the virtual machine at the not-running stage of the virtual machine, which may implement migration of the virtual machine parameters correctly and solve the service interruption problem in virtual machine migration.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
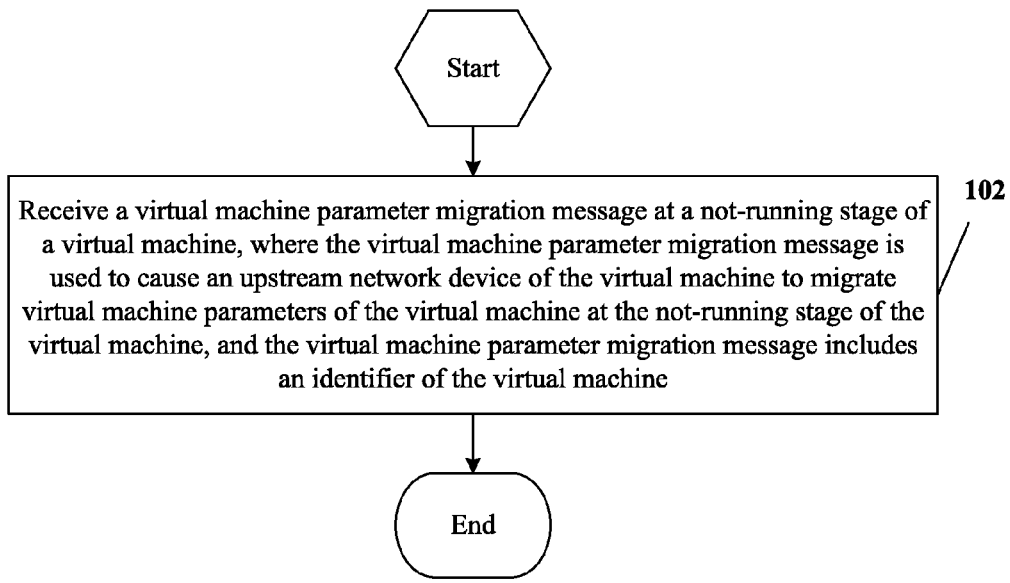
FIG. 1 is a flowchart of a method for migrating virtual machine parameters according to an embodiment of the present invention.

The following describes an embodiment of the present invention with reference to FIG. 1.

FIG. 1 is a flowchart of a method for migrating virtual machine parameters according to an embodiment of the present invention. The method includes the following.

102. Receive a virtual machine parameter migration message at a not-running stage of a virtual machine, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

Virtual machine parameters to be migrated include dynamic information, which may be dynamic information in the upstream network device of the virtual machine or may also be dynamic information and static configurations.

The not-running stage of the virtual machine refers to a stage at which virtual machine to be migrated does not provide services at both an out-migration location and in-migration location. Generally at this stage, the virtual machine to be migrated completes copying of the memory from the out-migration location to the in-migration location. At the not-running stage of the virtual machine, the virtual machine to be migrated does not provide services, and dynamic information in corresponding virtual machine parameters on the upstream network device of the virtual machine does not change. Therefore, migrating the virtual machine parameters at the not-running stage of the virtual machine may implement migration of the virtual machine parameters correctly.

The upstream network device refers to each network device that needs a configuration of virtual machine parameters on a path from the virtual machine to a gateway, and includes a router, a switch, a firewall, a load balancer, or other network devices, and all the network devices may be regarded as upstream network devices so long as they need a configuration of virtual machine parameters.

The server where the virtual machine to be migrated is located sends a virtual machine parameter migration message at the not-running stage of the virtual machine, so as to ensure that the virtual machine parameters are migrated at the not-running stage of the virtual machine. Generally, a virtual machine, a virtual switch, and other entities run on the server where the virtual machine to be migrated is located. The virtual machine parameter migration message may be sent by the virtual machine, or the virtual switch connected to the virtual machine, or other entities, which may learn the migration state of the virtual machine, on the server where the virtual machine is located.

The virtual machine parameter migration message includes the identifier of the virtual machine to be migrated, so that virtual machine parameters corresponding to which virtual machine need to be migrated is notified to the receiver. Optionally, the virtual machine parameter migration message may further include a virtual machine parameter migration indication. The virtual machine parameter migration indication is used to instruct the receiver to migrate virtual machine parameters at the not-running stage of the virtual machine. Optionally, the virtual machine parameter migration indication may further indicate the current state of the virtual machine, for example, not running or ready to start. Optionally, the virtual machine parameter migration indication may further indicate the migration state of the virtual machine, such as in-migration or out-migration. The current state of the virtual machine and the migration state of the virtual machine may be indicated respectively, or the same group of information may be reused, for example, not running may not only indicate that the virtual machine is in the not-running state, but also indicate that the migration state of the virtual machine is out-migration; beginning to start may not only indicate that the virtual machine is in the beginning to start state, but also indicate that the migration state of the virtual machine is in-migration. The virtual machine parameter migration indication may be a flag bit or a state value, or a combination thereof.

The virtual machine parameter migration message may be an extended virtual machine discovery and configuration protocol (VDP) message, for example, an extended Associate message or a newly defined VDP message. The virtual machine parameter migration message may also be other types of messages, for example, a user-defined message in a new protocol.

The virtual machine parameter migration message is used to cause the upstream network device of the virtual machine to migrate virtual machine parameters of the virtual machine at the not-running stage of the virtual machine. For example, a migration management apparatus receives the virtual machine parameter migration message. Because the virtual machine parameter migration message is sent at the not-running stage of the virtual machine, the migration management apparatus may initiate migration of virtual machine parameters at the not-running stage of the virtual machine. Or the upstream network device of the virtual machine may receive the virtual machine parameter migration message. Because the virtual machine parameter migration message is sent at the not-running stage of the virtual machine, the network device that receives the virtual machine parameter migration message may migrate virtual machine parameters at the not-running stage of the virtual machine.

If the migration management apparatus receives the virtual machine parameter migration message, the server where the virtual machine to be migrated is located sends a virtual machine parameter migration message to the migration management apparatus at the not-running stage of the virtual machine, where the virtual machine parameter migration message may be a user-defined message including the identifier of the virtual machine. Optionally, the virtual machine parameter migration message may also include a virtual machine parameter migration indication.

After receiving the virtual machine parameter migration message, the migration management apparatus determines, according to a network topology, the network device which needs to migrate virtual machine parameters. The network topology includes connection relationships between network devices and types of the network devices. The network topology may be obtained from a network management apparatus by the migration management apparatus, or may be stored by the migration management apparatus itself. The migration management apparatus initiates migration of virtual machine parameters according to the network device which needs to migrate virtual machine parameters.

Because the virtual machine parameter migration message is sent at the not-running stage of the virtual machine, the migration management apparatus may initiate migration of virtual machine parameters at the not-running stage of the virtual machine.

The migration management apparatus may initiate migration of virtual machine parameters at the not-running stage of the virtual machine in multiple manners.

For example, after receiving the virtual machine parameter migration message, the migration management apparatus may acquire virtual machine parameters of an upstream network device at an out-migration location of the virtual machine, and send the acquired virtual machine parameters to an upstream network device at an in-migration location of the virtual machine.

If there are multiple upstream network devices at the out-migration location or in-migration location of the virtual machine, after acquiring the virtual machine parameters, the migration management apparatus sends the virtual machine parameters to the corresponding upstream network devices at in-migration location.

For example, if among the upstream network devices at the out-migration location of the virtual machine, an upstream network device that enables the DHCP snooping function has a firewall function, while among the upstream network devices at the in-migration location of the virtual machine, there is an independent firewall, which is not the same device as an upstream network device that enables the DHCP snooping function. In this case, the migration management apparatus acquires a TCP connection table and a DHCP snooping table from the upstream network device at the out-migration location of the virtual machine, sends the TCP connection table to the firewall among the upstream network devices at the in-migration location of the virtual machine, and sends the DHCP snooping table to the upstream network device that enables the DHCP snooping function among the upstream network devices at the in-migration location of the virtual machine.

After the migration management apparatus acquires the virtual machine parameters, the upstream network device at the out-migration location of the virtual machine may delete the corresponding virtual machine parameters, or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter acquisition message to the upstream network device at the in-migration location of the virtual machine, where the virtual machine parameter acquisition message includes the identifier of the virtual machine and an identifier of a corresponding upstream network device at the out-migration location of the virtual machine. The virtual machine parameter acquisition message is used to cause the upstream network device at the in-migration location of the virtual machine to acquire virtual machine parameters of the corresponding upstream network device at the out-migration location according to the identifier of the virtual machine and the identifier of the corresponding upstream network device at the out-migration location.

The migration management apparatus adds, to the virtual machine parameter acquisition message, the identifier of the virtual machine in the virtual machine parameter migration message and the identifier of the network device having corresponding virtual machine parameters. The network device that receives the virtual machine parameter acquisition message acquires virtual machine parameters of the virtual machine corresponding to the identifier of the virtual machine from the network device corresponding to the identifier of the network device in the virtual machine parameter acquisition message. Optionally, the virtual machine parameter acquisition message may further carry the type of the virtual machine parameters to be migrated, for example, one or more of a TCP connection table, a DHCP snooping table, accumulative data, and so on. The network device that receives the virtual machine parameter acquisition message acquires virtual machine parameters of a corresponding type according to the type of the virtual machine parameters to be migrated.

After the upstream network device at the in-migration location of the virtual machine acquires the virtual machine parameters, the upstream network device at the out-migration location of the virtual machine may delete the corresponding virtual machine parameters, or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter push message to the upstream network device at the out-migration location of the virtual machine, where the virtual machine parameter push message includes the identifier of the virtual machine and an identifier of a corresponding upstream network device at the in-migration location of the virtual machine. The virtual machine parameter push message is used to cause the upstream network device at the out-migration location of the virtual machine to push virtual machine parameters to the corresponding upstream network device at the in-migration location according to the identifier of the virtual machine and the identifier of the corresponding upstream network device at the in-migration location.

The migration management apparatus adds, to the virtual machine parameter push message, the identifier of the virtual machine in the virtual machine parameter migration message and the identifier of the network device that needs corresponding virtual machine parameters. The network device that receives the virtual machine parameter push message pushes virtual machine parameters of the virtual machine corresponding to the identifier of the virtual machine to the network device corresponding to the identifier of the network device in the virtual machine parameter push message. Optionally, the virtual machine parameter push message may further carry the type of the virtual machine parameters to be migrated, for example, one or more of a TCP connection table, a DHCP snooping table, accumulative data, and so on. The network device that receives the virtual machine parameter push message pushes virtual machine parameters of the corresponding type according to the type of the virtual machine parameters to be migrated.

After pushing the virtual machine parameters, the upstream network device at the out-migration location of the virtual machine may delete the corresponding virtual machine parameters or wait for aging of the parameters without processing the parameters.

If it is the upstream network device of the virtual machine receives the virtual machine parameter migration message, the server where the virtual machine to be migrated is located needs to send a virtual machine parameter migration message to the upstream network device of the virtual machine at the not-running stage of the virtual machine, where the virtual machine parameter migration message may be an extended VDP message or a user-defined message. The server where the virtual machine to be migrated is located may send a virtual machine parameter migration message whose destination address is a gateway of the virtual machine. Thereby, the virtual machine parameter migration message may be received by the upstream network device of the virtual machine. The server where the virtual machine to be migrated is located may also send a virtual machine parameter migration message whose destination address is a specific multicast address. The network device, which receives the virtual machine parameter migration message, forwards the virtual machine parameter migration message to its upstream port, namely, a port directed to the gateway. The upstream network device of the virtual machine migrates virtual machine parameters after receiving the virtual machine parameter migration message whose destination address is the specific multicast address.

The virtual machine parameter migration message includes the identifier of the virtual machine and a virtual machine parameter migration indication. The virtual machine parameter migration indication is used to instruct the upstream network device of the virtual machine to migrate virtual machine parameters at the not-running stage of the virtual machine and used to indicate a migration state of the virtual machine, where the migration state includes in-migration and out-migration. Because the virtual machine parameter migration message is sent at the not-running stage of the virtual machine, the upstream network device of the virtual machine may migrate virtual machine parameters at the not-running stage of the virtual machine.

After receiving the virtual machine parameter migration message, the network device performs corresponding operations according to the migration state indicated by the virtual machine parameter migration indication. For example, if the migration state indicated by the virtual machine parameter migration indication is out-migration, it indicates that the network device that receives the virtual machine parameter migration message is an upstream network device at the out-migration location of the virtual machine; therefore the network device sends virtual machine parameters to a virtual machine parameter management apparatus. If the migration state indicated by the virtual machine parameter migration indication is in-migration, it indicates that the network device that receives the virtual machine parameter migration message is an upstream network device at the in-migration location of the virtual machine; therefore the network device acquires virtual machine parameters from the virtual machine parameter management apparatus.

The network device may only acquire dynamic information that is related to the identifier of the virtual machine in the virtual machine parameter migration message and complying with attributes of the network device.

If the virtual machine parameter migration message sent at the not-running stage of the virtual machine by the server where the virtual machine to be migrated is located is an extended virtual machine discovery and configuration protocol message, for example, an extended Associate message or a newly defined VDP message. Because the virtual machine discovery and configuration protocol message is generally only sent to a switch which is directly connected to the server, the switch may convert the extended virtual machine discovery and configuration protocol message into a virtual machine parameter migration message that may be forwarded continuously. The converted virtual machine parameter migration message may be a user-defined message, including the identifier of the virtual machine and the virtual machine parameter migration indication in the virtual machine parameter migration message of the virtual machine discovery and configuration protocol format before conversion.

According to the technical solution provided by this embodiment of the present invention, because at the not-running stage of the virtual machine, the virtual machine to be migrated does not provide services, and dynamic information in corresponding virtual machine parameters on the upstream network device of the virtual machine does not change, the upstream network device of the virtual machine migrates the virtual machine parameters of the virtual machine at the not-running stage of the virtual machine, which may implement migration of the virtual machine parameters correctly and solve the service interruption problem in virtual machine migration.

Figure 2:
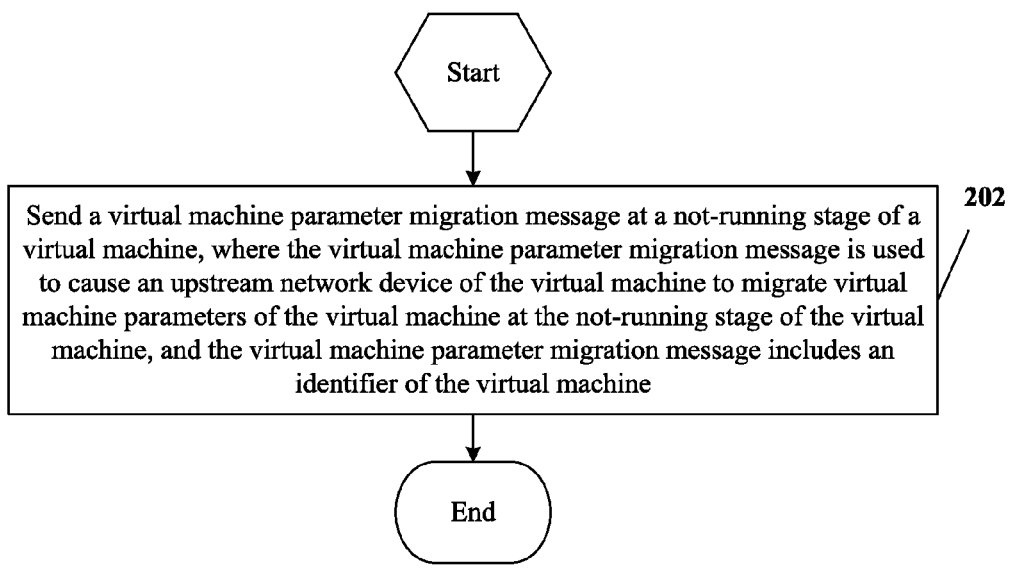
FIG. 2 is a flowchart of a method for migrating virtual machine parameters according to another embodiment of the present invention.

The following describes another embodiment of the present invention with reference to FIG. 2.

FIG. 2 is a flowchart of a method for migrating virtual machine parameters according to another embodiment of the present invention. The method corresponds to the embodiment shown in FIG. 1, and the method for migrating virtual machine parameters in the embodiment of the present invention is described from the perspective of a sender. The method includes the following.

202. Send a virtual machine parameter migration message at a not-running stage of a virtual machine, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

The server where the virtual machine to be migrated is located sends a virtual machine parameter migration message at the not-running stage of the virtual machine, so as to ensure that the virtual machine parameters are migrated at the not-running stage of the virtual machine. Generally, a virtual machine, a virtual switch, and other entities run on the server where the virtual machine to be migrated is located. The virtual machine parameter migration message may be sent by the virtual machine, or the virtual switch connected to the virtual machine, or other entities, which may learn the migration state of the virtual machine, on the server where the virtual machine is located.

The virtual machine parameter migration message includes the identifier of the virtual machine to be migrated, so that virtual machine parameters of which virtual machine need to be migrated is notified to the receiver. Optionally, the virtual machine parameter migration message may further include a virtual machine parameter migration indication. The virtual machine parameter migration indication is used to instruct the receiver to migrate virtual machine parameters at the not-running stage of the virtual machine. Optionally, the virtual machine parameter migration indication may further indicate the current state of the virtual machine, for example, not running or beginning to start. Optionally, the virtual machine parameter migration indication may further indicate the migration state of the virtual machine, such as in-migration or out-migration. The current state of the virtual machine and the migration state of the virtual machine may be indicated respectively, or the same group of information may be reused, for example, not running may not only indicate that the virtual machine is in the not-running state, but also indicate that the migration state of the virtual machine is out-migration; beginning to start may not only indicate that the virtual machine is in the beginning to start state, but also indicate that the migration state of the virtual machine is in-migration. The virtual machine parameter migration indication may be a flag bit or a state value, or a combination thereof.

The virtual machine parameter migration message may be an extended VDP message, for example, an extended Associate message or a newly defined VDP message. The virtual machine parameter migration message may also be other types of messages, for example, a user-defined message in a new protocol.

The virtual machine parameters to be migrated include dynamic information, which may be dynamic information in the upstream network device of the virtual machine or may also be dynamic information and static configurations.

The not-running stage of the virtual machine refers to a stage at which the virtual machine to be migrated does not provide services at both the out-migration location and the in-migration location. Generally at this stage, the virtual machine to be migrated completes copying of the memory from the out-migration location to the in-migration location. At the not-running stage of the virtual machine, the virtual machine to be migrated does not provide services, and dynamic information in corresponding virtual machine parameters on the upstream network device of the virtual machine does not change. Therefore, migrating the virtual machine parameters at the not-running stage of the virtual machine may implement migration of the virtual machine parameters correctly.

The upstream network device refers to each network device that needs a configuration of virtual machine parameters on the path from the virtual machine to a gateway, and includes a router, a switch, a firewall, a load balancer, or other network devices, and all the network devices can be regarded as upstream network devices so long as they need a configuration of virtual machine parameters.

The virtual machine parameter migration message is used to cause the upstream network device of the virtual machine to migrate virtual machine parameters of the virtual machine at the not-running stage of the virtual machine. For example, the virtual machine parameter migration message is sent to a migration management apparatus. Because the virtual machine parameter migration message is sent at the not-running stage of the virtual machine, the migration management apparatus may initiate migration of virtual machine parameters at the not-running stage of the virtual machine. Or the virtual machine parameter migration message may be sent to the upstream network device of the virtual machine. Because the virtual machine parameter migration message is sent at the not-running stage of the virtual machine, the network device that receives the virtual machine parameter migration message may migrate virtual machine parameters at the not-running stage of the virtual machine.

For example, a virtual machine parameter migration message is sent to the migration management apparatus; the server where the virtual machine to be migrated is located sends a virtual machine parameter migration message to the migration management apparatus at the not-running stage of the virtual machine, where the virtual machine parameter migration message may be a user-defined message including the identifier of the virtual machine. Optionally, the virtual machine parameter migration message may also include a virtual machine parameter migration indication.

After receiving the virtual machine parameter migration message, the migration management apparatus determines, according to a network topology, the network device which needs to migrate virtual machine parameters. The network topology includes connection relationships between network devices and types of the network devices. The network topology may be obtained, from a network management apparatus, by the migration management apparatus, or may be stored by the migration management apparatus itself. The migration management apparatus initiates migration of virtual machine parameters according to the network device which needs to migrate virtual machine parameters.

Because the virtual machine parameter migration message is sent at the not-running stage of the virtual machine, the migration management apparatus may initiate migration of virtual machine parameters at the not-running stage of the virtual machine.

The migration management apparatus may initiate migration of virtual machine parameters at the not-running stage of the virtual machine in multiple manners.

For example, after receiving the virtual machine parameter migration message, the migration management apparatus may acquire virtual machine parameters of an upstream network device at an out-migration location of the virtual machine, and send the acquired virtual machine parameters to an upstream network device at an in-migration location of the virtual machine.

If there are multiple upstream network devices at the out-migration location or in-migration location of the virtual machine, after acquiring the virtual machine parameters, the migration management apparatus sends the virtual machine parameters to the corresponding upstream network devices at the in-migration location.

For example, if among the upstream network devices at the out-migration location of the virtual machine, an upstream network device that enables the DHCP snooping function has a firewall function, while among the upstream network devices at the in-migration location of the virtual machine, there is an independent firewall, which is not the same device as an upstream network device that enables the DHCP snooping function. In this case, the migration management apparatus acquires a TCP connection table and a DHCP snooping table from the upstream network device at the out-migration location of the virtual machine, sends the TCP connection table to the firewall among the upstream network devices at the in-migration location of the virtual machine, and sends the DHCP snooping table to the upstream network device that enables the DHCP snooping function among the upstream network devices at the in-migration location of the virtual machine.

After the migration management apparatus acquires the virtual machine parameters, the upstream network device at the out-migration location of the virtual machine may delete the corresponding virtual machine parameters or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter acquisition message to the upstream network device at the in-migration location of the virtual machine, where the virtual machine parameter acquisition message includes the identifier of the virtual machine and an identifier of the corresponding upstream network device at the out-migration location of the virtual machine. The virtual machine parameter acquisition message is used to cause the upstream network device at the in-migration location of the virtual machine to acquire virtual machine parameters of the corresponding upstream network device at the out-migration location according to the identifier of the virtual machine and the identifier of the corresponding upstream network device at the out-migration location.

The migration management apparatus adds, to the virtual machine parameter acquisition message, the identifier of the virtual machine in the virtual machine parameter migration message and the identifier of the network device having corresponding virtual machine parameters. The network device that receives the virtual machine parameter acquisition message acquires virtual machine parameters of the virtual machine corresponding to the identifier of the virtual machine from the network device corresponding to the identifier of the network device in the virtual machine parameter acquisition message. Optionally, the virtual machine parameter acquisition message may further carry the type of the virtual machine parameters to be migrated, for example, one or more of a TCP connection table, a DHCP snooping table, accumulative data, and so on. The network device that receives the virtual machine parameter acquisition message acquires virtual machine parameters of the corresponding type according to the type of the virtual machine parameters to be migrated.

After the upstream network device at the in-migration location of the virtual machine acquires the virtual machine parameters, the upstream network device at the out-migration location of the virtual machine may delete the corresponding virtual machine parameters or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter push message to the upstream network device at the out-migration location of the virtual machine, where the virtual machine parameter push message includes the identifier of the virtual machine and an identifier of the corresponding upstream network device at the in-migration location of the virtual machine. The virtual machine parameter push message is used to cause the upstream network device at the out-migration location of the virtual machine to push virtual machine parameters to the corresponding upstream network device at the in-migration location according to the identifier of the virtual machine and the identifier of the corresponding upstream network device at the in-migration location.

The migration management apparatus adds, to the virtual machine parameter push message, the identifier of the virtual machine in the virtual machine parameter migration message and the identifier of the network device that needs corresponding virtual machine parameters. The network device that receives the virtual machine parameter push message pushes virtual machine parameters of the virtual machine corresponding to the identifier of the virtual machine to the network device corresponding to the identifier of the network device in the virtual machine parameter push message. Optionally, the virtual machine parameter push message may further carry the type of the virtual machine parameters to be migrated, for example, one or more of a TCP connection table, a DHCP snooping table, accumulative data, and so on. The network device that receives the virtual machine parameter push message pushes virtual machine parameters of the corresponding type according to the type of the virtual machine parameters to be migrated.

After pushing the virtual machine parameters, the upstream network device at the out-migration location of the virtual machine may delete the corresponding virtual machine parameters or wait for aging of the parameters without processing the parameters.

If it is the upstream network device of the virtual machine receives the virtual machine parameter migration message, the server where the virtual machine to be migrated is located needs to send a virtual machine parameter migration message to the upstream network device of the virtual machine at the not-running stage of the virtual machine, where the virtual machine parameter migration message may be an extended VDP message or a user-defined message. The server where the virtual machine to be migrated is located may send a virtual machine parameter migration message whose destination address is a gateway of the virtual machine. Thereby, the virtual machine parameter migration message may be received by the upstream network device of the virtual machine. The server where the virtual machine to be migrated is located may also send a virtual machine parameter migration message whose destination address is a specific multicast address. The network device, which receives the virtual machine parameter migration message, forwards the virtual machine parameter migration message to its upstream port, namely, a port directed to the gateway. The upstream network device of the virtual machine migrates virtual machine parameters after receiving the virtual machine parameter migration message whose destination address is the specific multicast address.

The virtual machine parameter migration message includes the identifier of the virtual machine and a virtual machine parameter migration indication. The virtual machine parameter migration indication is used to instruct the upstream network device of the virtual machine to migrate virtual machine parameters at the not-running stage of the virtual machine and used to indicate a migration state of the virtual machine, where the migration state includes in-migration and out-migration. Because the virtual machine parameter migration message is sent at the not-running stage of the virtual machine, the upstream network device of the virtual machine may migrate virtual machine parameters at the not-running stage of the virtual machine.

The virtual machine parameter migration message is used to cause the network device, which receives the message, to perform corresponding operations according to the migration state indicated by the virtual machine parameter migration indication.

For example, a server at the out-migration location of the virtual machine sends a virtual machine parameter migration message to the upstream network device at the not-running stage of the virtual machine, so that the upstream network device at the out-migration location of the virtual machine sends virtual machine parameters to a virtual machine parameter management apparatus. The migration state indicated by the virtual machine parameter migration indication in the virtual machine parameter migration message sent by the server at the out-migration location of the virtual machine is out-migration, and the network device that receives the message sends virtual machine parameters to the virtual machine parameter management apparatus.

For another example, a server at the in-migration location of the virtual machine sends a virtual machine parameter migration message to the upstream network device at the not-running stage of the virtual machine, so that the upstream network device at the in-migration location of the virtual machine acquires virtual machine parameters from the virtual machine parameter management apparatus. The migration state indicated by the virtual machine parameter migration indication in the virtual machine parameter migration message sent by the server at the in-migration location of the virtual machine is in-migration, and the network device that receives the message acquires virtual machine parameters from the virtual machine parameter management apparatus.

The network device may only acquire dynamic information that is related to the identifier of the virtual machine in the virtual machine parameter migration message and complying with attributes of the network device.

If the virtual machine parameter migration message sent at the not-running stage of the virtual machine by the server where the virtual machine to be migrated is located is an extended virtual machine discovery and configuration protocol message, for example, an extended Associate message or a newly defined VDP message, because the virtual machine discovery and configuration protocol message is generally only sent to a switch directly connected to the server, the switch directly connected to the server may convert the extended virtual machine discovery and configuration protocol message into a virtual machine parameter migration message that may be forwarded continuously. The converted virtual machine parameter migration message may be a user-defined message, including the identifier of the virtual machine and the virtual machine parameter migration indication in the virtual machine parameter migration message of the virtual machine discovery and configuration protocol format before conversion.

According to the technical solution provided by the embodiment of the present invention, because at the not-running stage of the virtual machine, the virtual machine to be migrated does not provide services, and dynamic information in corresponding virtual machine parameters on the upstream network device of the virtual machine does not change, the upstream network device of the virtual machine migrates the virtual machine parameters of the virtual machine at the not-running stage of the virtual machine, which may implement migration of the virtual machine parameters correctly and solve the service interruption problem in virtual machine migration.

Figure 3:
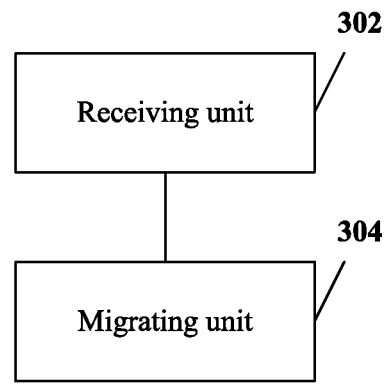
FIG. 3 is a block diagram of a migration management apparatus according to an embodiment of the present invention.

The following describes still another embodiment of the present invention with reference to FIG. 3.

FIG. 3 is a block diagram of a migration management apparatus according to an embodiment of the present invention. The migration management apparatus includes a receiving unit 302 and a migrating unit 304, where the receiving unit 302 is configured to receive a virtual machine parameter migration message, where the virtual machine parameter migration message is used to cause an upstream network device of the virtual machine to migrate virtual machine parameters of the virtual machine at a not-running stage of the virtual machine, and the virtual machine parameter migration message includes an identifier of the virtual machine, and the migrating unit 304 is configured to migrate virtual machine parameters according to the virtual machine parameter migration message.

The virtual machine parameters to be migrated include dynamic information, which may be dynamic information in the upstream network device of the virtual machine or may also be dynamic information and static configurations.

The not-running stage of the virtual machine refers to a stage at which the virtual machine to be migrated does not provide services at both the out-migration location and the in-migration location. Generally at this stage, the virtual machine to be migrated completes copying of the memory from the out-migration location to the in-migration location. At the not-running stage of the virtual machine, the virtual machine to be migrated does not provide services, and dynamic information in corresponding virtual machine parameters on the upstream network device of the virtual machine does not change. Therefore, migrating the virtual machine parameters at the not-running stage of the virtual machine may implement migration of the virtual machine parameters correctly.

The upstream network device refers to each network device that needs a configuration of virtual machine parameters on the path from the virtual machine to a gateway, and includes a router, a switch, a firewall, a load balancer, or other network devices, and all the network devices may be regarded as upstream network devices so long as they need a configuration of virtual machine parameters.

The server where the virtual machine to be migrated is located sends a virtual machine parameter migration message at the not-running stage of the virtual machine, so as to ensure that the virtual machine parameters are migrated at the not-running stage of the virtual machine. Generally, a virtual machine, a virtual switch, and other entities run on the server where the virtual machine to be migrated is located. The virtual machine parameter migration message may be sent by the virtual machine, or the virtual switch connected to the virtual machine, or other entities, which may learn the migration state of the virtual machine, on the server where the virtual machine is located.

The virtual machine parameter migration message includes the identifier of the virtual machine to be migrated, so that virtual machine parameters of which virtual machine need to be migrated is notified to the receiver. Optionally, the virtual machine parameter migration message may further include a virtual machine parameter migration indication. The virtual machine parameter migration indication is used to instruct the receiver to migrate virtual machine parameters at the not-running stage of the virtual machine. Optionally, the virtual machine parameter migration indication may further indicate the current state of the virtual machine, for example, not running or beginning to start. Optionally, the virtual machine parameter migration indication may further indicate the migration state of the virtual machine, such as in-migration or out-migration. The current state of the virtual machine and the migration state of the virtual machine may be indicated respectively, or the same group of information may be reused, for example, not running may not only indicate that the virtual machine is in the not-running state, but also indicate that the migration state of the virtual machine is out-migration; beginning to start may not only indicate that the virtual machine is in the beginning to start state, but also indicate that the migration state of the virtual machine is in-migration. The virtual machine parameter migration indication may be a flag bit or a state value, or a combination thereof.

The virtual machine parameter migration message may be a user-defined message in a new protocol.

The server where the virtual machine to be migrated is located sends a virtual machine parameter migration message to the migration management apparatus at the not-running stage of the virtual machine, where the virtual machine parameter migration message may be a user-defined message including the identifier of the virtual machine. Optionally, the virtual machine parameter migration message may also include a virtual machine parameter migration indication. Because the virtual machine parameter migration message is sent at the not-running stage of the virtual machine, the migration management apparatus may initiate migration of virtual machine parameters at the not-running stage of the virtual machine.

The server where the virtual machine to be migrated is located sends a virtual machine parameter migration message to the migration management apparatus at the not-running stage of the virtual machine, where the virtual machine parameter migration message may be a user-defined message including the identifier of the virtual machine. Optionally, the virtual machine parameter migration message may also include a virtual machine parameter migration indication.

The migrating unit 304 may be further configured to determine, according to a network topology, the network device which needs to migrate virtual machine parameters. The network topology includes connection relationships between network devices and types of the network devices. The network topology may be obtained from a network management apparatus, or may be stored in the migration management apparatus. The migrating unit 304 initiates migration of virtual machine parameters according to the network device which needs to migrate virtual machine parameters.

Because the virtual machine parameter migration message is sent at the not-running stage of the virtual machine, the migration management apparatus may initiate migration of virtual machine parameters at the not-running stage of the virtual machine.

The migrating unit 304 may be implemented in multiple manners.

For example, the migrating unit 304 is specifically configured to acquire virtual machine parameters of an upstream network device at an out-migration location of the virtual machine, and send the acquired virtual machine parameters to an upstream network device at an in-migration location of the virtual machine.

If there are multiple upstream network devices at the out-migration location or in-migration location of the virtual machine, after acquiring the virtual machine parameters, the migrating unit 304 sends the virtual machine parameters to the corresponding upstream network devices at the in-migration location.

For example, if among the upstream network devices at the out-migration location of the virtual machine, an upstream network device that enables the DHCP snooping function has a firewall function, while among the upstream network devices at the in-migration location of the virtual machine, there is an independent firewall, which is not the same device as an upstream network device that enables the DHCP snooping function. In this case, the migrating unit 304 acquires a TCP connection table and a DHCP snooping table from the upstream network device at the out-migration location of the virtual machine, sends the TCP connection table to the firewall among the upstream network devices at the in-migration location of the virtual machine, and sends the DHCP snooping table to the upstream network device that enables the DHCP snooping function among the upstream network devices at the in-migration location of the virtual machine.

After the migration management apparatus acquires the virtual machine parameters, the upstream network device at the out-migration location of the virtual machine may delete the corresponding virtual machine parameters or wait for aging of the parameters without processing the parameters.

The migrating unit 304 may also be specifically configured to send a virtual machine parameter acquisition message to the upstream network device at the in-migration location of the virtual machine, where the virtual machine parameter acquisition message includes the identifier of the virtual machine and an identifier of the corresponding upstream network device at the out-migration location of the virtual machine. The virtual machine parameter acquisition message is used to cause the upstream network device at the in-migration location of the virtual machine to acquire virtual machine parameters of the corresponding upstream network device at the out-migration location according to the identifier of the virtual machine and the identifier of the corresponding upstream network device at the out-migration location.

The migration management apparatus adds, to the virtual machine parameter acquisition message, the identifier of the virtual machine in the virtual machine parameter migration message and the identifier of the network device having corresponding virtual machine parameters. The network device that receives the virtual machine parameter acquisition message acquires virtual machine parameters of the virtual machine corresponding to the identifier of the virtual machine from the network device corresponding to the identifier of the network device in the virtual machine parameter acquisition message. Optionally, the virtual machine parameter acquisition message may further carry the type of the virtual machine parameters to be migrated, for example, one or more of a TCP connection table, a DHCP snooping table, accumulative data, and so on. The network device that receives the virtual machine parameter acquisition message acquires virtual machine parameters of the corresponding type according to the type of the virtual machine parameters to be migrated.

After the upstream network device at the in-migration location of the virtual machine acquires the virtual machine parameters, the upstream network device at the out-migration location of the virtual machine may delete the corresponding virtual machine parameters or wait for aging of the parameters without processing the parameters.

The migrating unit 304 may also be specifically configured to send a virtual machine parameter push message to the upstream network device at the out-migration location of the virtual machine, where the virtual machine parameter push message includes the identifier of the virtual machine and an identifier of the corresponding upstream network device at the in-migration location of the virtual machine. The virtual machine parameter push message is used to cause the upstream network device at the out-migration location of the virtual machine to push virtual machine parameters to the corresponding upstream network device at the in-migration location according to the identifier of the virtual machine and the identifier of the corresponding upstream network device at the in-migration location.

The migration management apparatus adds, to the virtual machine parameter push message, the identifier of the virtual machine in the virtual machine parameter migration message and the identifier of the network device that needs corresponding virtual machine parameters. The network device that receives the virtual machine parameter push message pushes virtual machine parameters of the virtual machine corresponding to the identifier of the virtual machine to the network device corresponding to the identifier of the network device in the virtual machine parameter push message. Optionally, the virtual machine parameter push message may further carry the type of the virtual machine parameters to be migrated, for example, one or more of a TCP connection table, a DHCP snooping table, accumulative data, and so on. The network device that receives the virtual machine parameter push message pushes virtual machine parameters of the corresponding type according to the type of the virtual machine parameters to be migrated.

After pushing the virtual machine parameters, the upstream network device at the out-migration location of the virtual machine may delete the corresponding virtual machine parameters or wait for aging of the parameters without processing the parameters.

According to the technical solution provided by the embodiment of the present invention, because at the not-running stage of the virtual machine, the virtual machine to be migrated does not provide services, and dynamic information in corresponding virtual machine parameters on the upstream network device of the virtual machine does not change, the upstream network device of the virtual machine migrates the virtual machine parameters of the virtual machine at the not-running stage of the virtual machine, and the migration management apparatus may complete migration of the virtual machine parameters correctly, which solve the service interruption problem in virtual machine migration.

Figure 4:
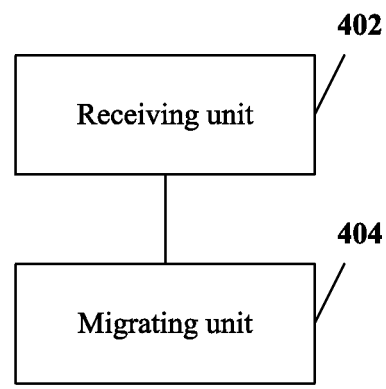
FIG. 4 is a block diagram of a network device according to an embodiment of the present invention.

The following describes another embodiment of the present invention with reference to FIG. 4.

FIG. 4 is a block diagram of a network device according to an embodiment of the present invention. The network device is located at an upstream path of a virtual machine, and includes a receiving unit 402 and a migrating unit 404, where the receiving unit 402 is configured to receive a virtual machine parameter migration message, where the virtual machine parameter migration message includes an identifier of the virtual machine and a virtual machine parameter migration indication, where the virtual machine parameter migration indication is used to instruct an upstream network device of the virtual machine to migrate virtual machine parameters at a not-running stage of the virtual machine and used to indicate a migration state of the virtual machine, where the migration state includes in-migration and out-migration, and the migrating unit 404 is configured to migrate virtual machine parameters according to the virtual machine parameter migration message.

The network device is located at the upstream path of the virtual machine. The upstream network path refers to a path from the virtual machine to a gateway. The network device may be a router, a switch, a firewall, a load balancer, or other network devices, and all the network devices may be regarded as network devices so long as they need a configuration of virtual machine parameters.

The virtual machine parameters to be migrated include dynamic information, which may be dynamic information in the upstream network device of the virtual machine or may also be dynamic information and static configurations.

The not-running stage of the virtual machine refers to a stage at which the virtual machine to be migrated does not provide services at both the out-migration location and the in-migration location. Generally at this stage, the virtual machine to be migrated completes copying of the memory from the out-migration location to the in-migration location. At the not-running stage of the virtual machine, the virtual machine to be migrated does not provide services, and dynamic information in corresponding virtual machine parameters on the upstream network device of the virtual machine does not change. Therefore, migrating the virtual machine parameters at the not-running stage of the virtual machine may implement migration of the virtual machine parameters correctly.

The server where the virtual machine to be migrated is located sends a virtual machine parameter migration message at the not-running stage of the virtual machine, so as to ensure that the virtual machine parameters are migrated at the not-running stage of the virtual machine. Generally, a virtual machine, a virtual switch, and other entities run on the server where the virtual machine to be migrated is located. The virtual machine parameter migration message may be sent by the virtual machine, or the virtual switch connected to the virtual machine, or other entities, which may learn the migration state of the virtual machine, on the server where the virtual machine is located.

The virtual machine parameter migration message may be an extended VDP message, for example, an extended Associate message, or a newly defined VDP message. The virtual machine parameter migration message may also be other types of messages, for example, a user-defined message in a new protocol.

The server where the virtual machine to be migrated is located may send a virtual machine parameter migration message whose destination address is a gateway of the virtual machine. Thereby, the virtual machine parameter migration message may be received by the upstream network device of the virtual machine. The server where the virtual machine to be migrated is located may also send a virtual machine parameter migration message whose destination address is a specific multicast address. The network device that receives the virtual machine parameter migration message forwards the virtual machine parameter migration message to its upstream port, namely, a port directed to the gateway. The upstream network device of the virtual machine migrates virtual machine parameters after receiving the virtual machine parameter migration message whose destination address is the specific multicast address.

The virtual machine parameter migration message includes the identifier of the virtual machine to be migrated, so that virtual machine parameters of which virtual machine need to be migrated is notified to the receiver. The virtual machine parameter migration message may further include a virtual machine parameter migration indication. The virtual machine parameter migration indication is used to instruct the receiver to migrate virtual machine parameters at the not-running stage of the virtual machine. The virtual machine parameter migration indication further indicates the migration state of the virtual machine, such as in-migration or out-migration. Optionally, the virtual machine parameter migration indication may further indicate the current state of the virtual machine, for example, not running or beginning to start. The current state of the virtual machine and the migration state of the virtual machine may be indicated respectively, or the same group of information may be reused, for example, not running may not only indicate that the virtual machine is in the not-running state, but also indicate that the migration state of the virtual machine is out-migration; beginning to start may not only indicate that the virtual machine is in the beginning to start state, but also indicate that the migration state of the virtual machine is in-migration. The virtual machine parameter migration indication may be a flag bit or a state value, or a combination thereof.

The migrating unit 404 performs corresponding operations according to the migration state indicated by the virtual machine parameter migration indication. For example, if the migration state indicated by the virtual machine parameter migration indication is out-migration, it indicates that the network device that receives the virtual machine parameter migration message is an upstream network device at the out-migration location of the virtual machine; therefore the migrating unit 404 sends virtual machine parameters to a virtual machine parameter management apparatus. If the migration state indicated by the virtual machine parameter migration indication is in-migration, it indicates that the network device that receives the virtual machine parameter migration message is an upstream network device at the in-migration location of the virtual machine; therefore the migrating unit 404 acquires virtual machine parameters from the virtual machine parameter management apparatus. The migrating unit 404 may only acquire dynamic information that is related to the identifier of the virtual machine in the virtual machine parameter migration message and complying with attributes of the network device.

If the virtual machine parameter migration message sent at the not-running stage of the virtual machine by the server where the virtual machine to be migrated is located is an extended virtual machine discovery and configuration protocol message, for example, an extended Associate message or a newly defined VDP message, because the virtual machine discovery and configuration protocol message is generally only sent to a switch directly connected to the server, the switch directly connected to the server may convert the extended virtual machine discovery and configuration protocol message into a virtual machine parameter migration message that may be forwarded continuously. The converted virtual machine parameter migration message may be a user-defined message, including the identifier of the virtual machine and the virtual machine parameter migration indication in the virtual machine parameter migration message of the virtual machine discovery and configuration protocol format before conversion.

Under circumstances where the switch directly connected to the server performs protocol conversion, if the network device located at the upstream path of the virtual machine is the switch directly connected to the server, the virtual machine parameter migration message received by the receiving unit 402 may be an extended VDP message or a user-defined message. If the network device located at the upstream path of the virtual machine is not the switch directly connected to the server, the virtual machine parameter migration message received by the receiving unit 402 is a user-defined message.

According to the technical solution provided by the embodiment of the present invention, because at the not-running stage of the virtual machine, the virtual machine to be migrated does not provide services, and dynamic information in corresponding virtual machine parameters on the upstream network device of the virtual machine does not change, the network device located at the upstream path of the virtual machine migrates the virtual machine parameters of the virtual machine at the not-running stage of the virtual machine, which may implement migration of the virtual machine parameters correctly and solve the service interruption problem in virtual machine migration.

Figure 5:
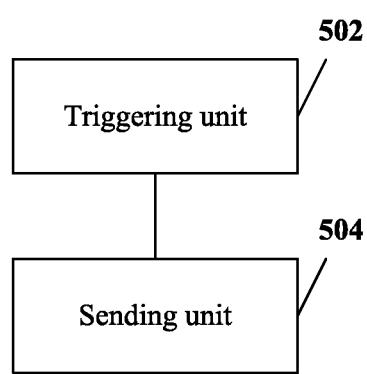
FIG. 5 is a block diagram of a virtual machine server according to still another embodiment of the present invention.

The following describes still another embodiment of the present invention with reference to FIG. 5.

FIG. 5 is a block diagram of a virtual machine server according to still another embodiment of the present invention. The virtual machine server includes a triggering unit 502 and a sending unit 504, where the triggering unit 502 is configured to trigger, at a not-running stage of a virtual machine, the sending unit 504 to send a virtual machine parameter migration message, and the sending unit 504 is configured to send the virtual machine parameter migration message, where the virtual machine parameter migration message is used to cause an upstream network device of the virtual machine to migrate virtual machine parameters of the virtual machine at the not-running stage of the virtual machine, and the virtual machine parameter migration message includes an identifier of the virtual machine.

The triggering unit 502 triggers, at the not-running stage of the virtual machine, the sending unit 504 to send a virtual machine parameter migration message, so as to ensure that the virtual machine parameters are migrated at the not-running stage of the virtual machine. The triggering unit 502 and sending unit 504 may be implemented by the virtual machine, or a virtual switch connected to the virtual machine, or other entities, which may learn the migration state of the virtual machine, on the server where the virtual machine is located.

The virtual machine parameter migration message includes the identifier of the virtual machine to be migrated, so that virtual machine parameters of which virtual machine need to be migrated is notified to the receiver. Optionally, the virtual machine parameter migration message may further include a virtual machine parameter migration indication.

The virtual machine parameter migration indication is used to instruct the receiver to migrate virtual machine parameters at the not-running stage of the virtual machine. Optionally, the virtual machine parameter migration indication may further indicate the current state of the virtual machine, for example, not running or beginning to start. Optionally, the virtual machine parameter migration indication may further indicate the migration state of the virtual machine, such as in-migration or out-migration. The current state of the virtual machine and the migration state of the virtual machine may be indicated respectively, or the same group of information may be reused, for example, not running may not only indicate that the virtual machine is in the not-running state, but also indicate that the migration state of the virtual machine is out-migration; beginning to start may not only indicate that the virtual machine is in the beginning to start state, but also indicate that the migration state of the virtual machine is in-migration. The virtual machine parameter migration indication may be a flag bit or a state value, or a combination thereof.

The virtual machine parameter migration message may be an extended VDP message, for example, an extended Associate message, or a newly defined VDP message. The virtual machine parameter migration message may also be other types of messages, for example, a user-defined message in a new protocol.

The virtual machine parameters to be migrated include dynamic information, which may be dynamic information in the upstream network device of the virtual machine or may also be dynamic information and static configurations.

The not-running stage of the virtual machine refers to a stage at which the virtual machine to be migrated does not provide services at both the out-migration location and the in-migration location. Generally at this stage, the virtual machine to be migrated completes copying of the memory from the out-migration location to the in-migration location. At the not-running stage of the virtual machine, the virtual machine to be migrated does not provide services, and dynamic information in corresponding virtual machine parameters on the upstream network device of the virtual machine does not change. Therefore, migrating the virtual machine parameters at the not-running stage of the virtual machine may implement migration of the virtual machine parameters correctly.

The upstream network device refers to each network device that needs a configuration of virtual machine parameters on the path from the virtual machine to a gateway, and includes a router, a switch, a firewall, a load balancer, or other network devices, and all the network devices may be regarded as upstream network devices so long as they need a configuration of virtual machine parameters.

The virtual machine parameter migration message is used to cause the upstream network device of the virtual machine to migrate virtual machine parameters of the virtual machine at the not-running stage of the virtual machine. For example, the sending unit 504 sends a virtual machine parameter migration message to a migration management apparatus. Because the virtual machine parameter migration message is sent at the not-running stage of the virtual machine, the migration management apparatus may initiate migration of virtual machine parameters at the not-running stage of the virtual machine. Or the sending unit 504 may send the virtual machine parameter migration message to the upstream network device of the virtual machine. Because the virtual machine parameter migration message is sent at the not-running stage of the virtual machine, the network device that receives the virtual machine parameter migration message may migrate virtual machine parameters at the not-running stage of the virtual machine.

For example, the sending unit 504 sends the virtual machine parameter migration message to the migration management apparatus; the triggering unit 502 triggers, at the not-running stage of the virtual machine, the sending unit 504 to send a virtual machine parameter migration message to the migration management apparatus, where the virtual machine parameter migration message may be a user-defined message including the identifier of the virtual machine. Optionally, the virtual machine parameter migration message may also include a virtual machine parameter migration indication.

After receiving the virtual machine parameter migration message, the migration management apparatus determines, according to a network topology, the network device which needs to migrate virtual machine parameters. The network topology includes connection relationships between network devices and types of the network devices. The network topology may be obtained by the migration management apparatus from a network management apparatus, or may be stored by the migration management apparatus itself. The migration management apparatus initiates migration of virtual machine parameters according to the network device which needs to migrate virtual machine parameters.

Because the virtual machine parameter migration message is sent at the not-running stage of the virtual machine, the migration management apparatus may initiate migration of virtual machine parameters at the not-running stage of the virtual machine.

The migration management apparatus may initiate migration of virtual machine parameters at the not-running stage of the virtual machine in multiple manners.

For example, after receiving the virtual machine parameter migration message, the migration management apparatus may acquire virtual machine parameters of an upstream network device at an out-migration location of the virtual machine, and send the acquired virtual machine parameters to an upstream network device at an in-migration location of the virtual machine.

If there are multiple upstream network devices at the out-migration location or in-migration location of the virtual machine, after acquiring the virtual machine parameters, the migration management apparatus sends the virtual machine parameters to the corresponding upstream network devices at the in-migration location.

For example, if among the upstream network devices at the out-migration location of the virtual machine, an upstream network device that enables the DHCP snooping function has a firewall function, while among the upstream network devices at the in-migration location of the virtual machine, there is an independent firewall, which is not the same device as an upstream network device that enables the DHCP snooping function. In this case, the migration management apparatus acquires a TCP connection table and a DHCP snooping table from the upstream network device at the out-migration location of the virtual machine, sends the TCP connection table to the firewall among the upstream network devices at the in-migration location of the virtual machine, and sends the DHCP snooping table to the upstream network device that enables the DHCP snooping function among the upstream network devices at the in-migration location of the virtual machine.

After the migration management apparatus acquires the virtual machine parameters, the upstream network device at the out-migration location of the virtual machine may delete the corresponding virtual machine parameters or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter acquisition message to the upstream network device at the in-migration location of the virtual machine, where the virtual machine parameter acquisition message includes the identifier of the virtual machine and an identifier of the corresponding upstream network device at the out-migration location of the virtual machine. The virtual machine parameter acquisition message is used to cause the upstream network device at the in-migration location of the virtual machine to acquire virtual machine parameters of the corresponding upstream network device at the out-migration location according to the identifier of the virtual machine and the identifier of the corresponding upstream network device at the out-migration location.

The migration management apparatus adds, to the virtual machine parameter acquisition message, the identifier of the virtual machine in the virtual machine parameter migration message and the identifier of the network device having corresponding virtual machine parameters. The network device that receives the virtual machine parameter acquisition message acquires virtual machine parameters of the virtual machine corresponding to the identifier of the virtual machine from the network device corresponding to the identifier of the network device in the virtual machine parameter acquisition message. Optionally, the virtual machine parameter acquisition message may further carry the type of the virtual machine parameters to be migrated, for example, one or more of a TCP connection table, a DHCP snooping table, accumulative data, and so on. The network device, which receives the virtual machine parameter acquisition message, acquires virtual machine parameters of the corresponding type according to the type of the virtual machine parameters to be migrated.

After the upstream network device at the in-migration location of the virtual machine acquires the virtual machine parameters, the upstream network device at the out-migration location of the virtual machine may delete the corresponding virtual machine parameters or wait for aging of the parameters without processing the parameters.

The manner of initiating migration of virtual machine parameters by the migration management apparatus at the not-running stage of the virtual machine may also be, after receiving the virtual machine parameter migration message, sending, by the migration management apparatus, a virtual machine parameter push message to the upstream network device at the out-migration location of the virtual machine, where the virtual machine parameter push message includes the identifier of the virtual machine and an identifier of the corresponding upstream network device at the in-migration location of the virtual machine. The virtual machine parameter push message is used to cause the upstream network device at the out-migration location of the virtual machine to push virtual machine parameters to the corresponding upstream network device at the in-migration location according to the identifier of the virtual machine and the identifier of the corresponding upstream network device at the in-migration location.

The migration management apparatus adds the identifier of the virtual machine in the virtual machine parameter migration message and the identifier of the network device that needs corresponding virtual machine parameters to the virtual machine parameter push message. The network device that receives the virtual machine parameter push message pushes virtual machine parameters of the virtual machine corresponding to the identifier of the virtual machine to the network device corresponding to the identifier of the network device in the virtual machine parameter push message. Optionally, the virtual machine parameter push message may further carry the type of the virtual machine parameters to be migrated, for example, one or more of a TCP connection table, a DHCP snooping table, accumulative data, and so on. The network device that receives the virtual machine parameter push message pushes virtual machine parameters of the corresponding type according to the type of the virtual machine parameters to be migrated.

After pushing the virtual machine parameters, the upstream network device at the out-migration location of the virtual machine may delete the corresponding virtual machine parameters or wait for aging of the parameters without processing the parameters.

If it is the upstream network device of the virtual machine receives the virtual machine parameter migration message, the triggering unit 502 triggers, at the not-running stage of the virtual machine, the sending unit 504 to send a virtual machine parameter migration message to the upstream network device of the virtual machine, where the virtual machine parameter migration message may be an extended VDP message or a user-defined message. The triggering unit 502 may send a virtual machine parameter migration message whose destination address is a gateway of the virtual machine. Thereby, the virtual machine parameter migration message may be received by the upstream network device of the virtual machine.

The virtual machine parameter migration message includes the identifier of the virtual machine and a virtual machine parameter migration indication. The virtual machine parameter migration indication is used to instruct the upstream network device of the virtual machine to migrate virtual machine parameters at the not-running stage of the virtual machine and used to indicate a migration state of the virtual machine, where the migration state includes in-migration and out-migration. Because the virtual machine parameter migration message is sent at the not-running stage of the virtual machine, the upstream network device of the virtual machine may migrate virtual machine parameters at the not-running stage of the virtual machine.

The virtual machine parameter migration message is used to cause the network device that receives the message to perform corresponding operations according to the migration state indicated by the virtual machine parameter migration indication.

For example, the sending unit 504 of a source virtual machine server, namely, a server at the out-migration location of the virtual machine, sends a virtual machine parameter migration message to the upstream network device at the not-running stage of the virtual machine, so that the upstream network device at the out-migration location of the virtual machine sends virtual machine parameters to a virtual machine parameter management apparatus. The migration state indicated by the virtual machine parameter migration indication in the virtual machine parameter migration message sent by the source virtual machine server is out-migration, and the network device that receives the message sends virtual machine parameters to the virtual machine parameter management apparatus.

For another example, the sending unit 504 of a destination virtual machine server, namely, a server at the in-migration location of the virtual machine, sends a virtual machine parameter migration message to the upstream network device at the not-running stage of the virtual machine, so that the upstream network device at the in-migration location of the virtual machine acquires virtual machine parameters from the virtual machine parameter management apparatus. The migration state indicated by the virtual machine parameter migration indication in the virtual machine parameter migration message sent by the destination virtual machine server is in-migration, and the network device that receives the message acquires virtual machine parameters from the virtual machine parameter management apparatus.

The network device may only acquire dynamic information that is related to the identifier of the virtual machine in the virtual machine parameter migration message and complying with attributes of the network device.

If the virtual machine parameter migration message sent by the sending unit 504 at the not-running stage of the virtual machine is an extended virtual machine discovery and configuration protocol message, for example, an extended Associate message or a newly defined VDP message, because the virtual machine discovery and configuration protocol message is generally only sent to a switch directly connected to the server, the switch directly connected to the server may convert the extended virtual machine discovery and configuration protocol message into a virtual machine parameter migration message that may be forwarded continuously. The converted virtual machine parameter migration message may be a user-defined message, including the identifier of the virtual machine and the virtual machine parameter migration indication in the virtual machine parameter migration message of the virtual machine discovery and configuration protocol format before conversion.

According to the technical solution provided by the embodiment of the present invention, because at the not-running stage of the virtual machine, the virtual machine to be migrated does not provide services, and dynamic information in corresponding virtual machine parameters on the upstream network device of the virtual machine does not change, the upstream network device of the virtual machine migrates the virtual machine parameters of the virtual machine at the not-running stage of the virtual machine, which may implement migration of the virtual machine parameters correctly and solve the service interruption problem in virtual machine migration.

It is understandable to persons of ordinary skill in the art that all or part of the steps in the methods provided in the preceding embodiments may be performed by hardware instructed by a program. The program may be stored in a computer readable storage medium, such as a ROM/RAM, a magnetic disk, and a CD-ROM.

The above descriptions are merely exemplary embodiments of the present invention, but the protection scope of the present invention is not limited thereto. Any modification or replacement that may be easily thought of by persons skilled in the art without departing from the technical scope of the present invention shall fall within the protection scope of the present invention. Therefore, the protection scope of the present invention is subject to the appended claims.

What is claimed is:

1. A method for migrating virtual machine parameters, comprising:
receiving a virtual machine parameter migration message sent by a first server at an out-migration location of a virtual machine, at a not-running stage of the virtual machine; and
migrating virtual machine parameters according to the virtual machine parameter migration message by causing an upstream network device corresponding to the out-migration location of the virtual machine to migrate the virtual machine parameters of the virtual machine at the not-running stage of the virtual machine, so that the virtual machine parameters of the virtual machine stored in the upstream network device corresponding to the out-migration location of the virtual machine are migrated to an upstream network device corresponding to an in-migration location of the virtual machine;
wherein the virtual machine parameter migration message comprises an identifier of the virtual machine;
wherein the virtual machine parameters are dynamic information stored in the upstream network device corresponding to the out-migration location of the virtual machine;
wherein the upstream network device corresponding to the out-migration location of the virtual machine is a network device that is between the first server from which the virtual machine is migrating and a first gateway; and
wherein the upstream network device corresponding to the in-migration location of the virtual machine is a network device that is between a second server to which the virtual machine is migrating and a second gateway.

2. The method according to claim 1, wherein the receiving the virtual machine parameter migration message comprises:
receiving, by a migration management apparatus, the virtual machine parameter migration message; and
initiating, by the migration management apparatus, migration of virtual machine parameters at the not-running stage of the virtual machine.

3. The method according to claim 2, wherein the initiating, by the migration management apparatus, migration of virtual machine parameters at the not-running stage of the virtual machine comprises one of the following:
acquiring, by the migration management apparatus, virtual machine parameters of the upstream network device corresponding to the out-migration location of the virtual machine, and sending the acquired virtual machine parameters to the upstream network device corresponding to the in-migration location of the virtual machine;
sending, by the migration management apparatus, a virtual machine parameter acquisition message to the upstream network device corresponding to the in-migration location of the virtual machine, wherein the virtual machine parameter acquisition message comprises the identifier of the virtual machine and an identifier of the upstream network device corresponding to the out-migration location of the virtual machine, and the virtual machine parameter acquisition message is used to cause the upstream network device corresponding to the in-migration location of the virtual machine to acquire virtual machine parameters of the upstream network device corresponding to the out-migration location according to the identifier of the virtual machine and the identifier of the upstream network device corresponding to the out-migration location; and
sending, by the migration management apparatus, a virtual machine parameter push message to the upstream network device of the out-migration location of the virtual machine, wherein the virtual machine parameter push message comprises the identifier of the virtual machine and an identifier of the upstream network device corresponding to the in-migration location of the virtual machine, and the virtual machine parameter push message is used to cause the upstream network device of the out-migration location of the virtual machine to push virtual machine parameters to the upstream network device corresponding to the in-migration location according to the identifier of the virtual machine and the identifier of the upstream network device corresponding to the in-migration location.

4. The method according to claim 1, wherein the receiving the virtual machine parameter migration message comprises:
receiving, by the upstream network device corresponding to the out-migration location of the virtual machine, the virtual machine parameter migration message; and
the method further comprises:
migrating, by the upstream network device corresponding to the out-migration location of the virtual machine, virtual machine parameters at the not-running stage of the virtual machine.

5. The method according to claim 4, wherein
the receiving, by the upstream network device corresponding to the out-migration location of the virtual machine, the virtual machine parameter migration message comprises:
receiving, by the upstream network device corresponding to the out-migration location of the virtual machine, the virtual machine parameter migration message sent by a server at the out-migration location of the virtual machine at the not-running stage of the virtual machine, and sending, by the upstream network device corresponding to the out-migration location of the virtual machine, virtual machine parameters to a virtual machine parameter management apparatus.

6. A method for migrating virtual machine parameters, comprising:
sending, by a first server at an out-migration location of a virtual machine, a virtual machine parameter migration message at a not-running stage of the virtual machine, wherein the virtual machine parameter migration message is used to cause an upstream network device corresponding to the out-migration location of the virtual machine to migrate virtual machine parameters of the virtual machine at the not-running stage of the virtual machine, so that the virtual machine parameters of the virtual machine stored in the upstream network device corresponding to the out-migration location of the virtual machine are migrated to an upstream network device corresponding to an in-migration location of the virtual machine;
wherein the virtual machine parameter migration message comprises an identifier of the virtual machine;
wherein the virtual machine parameters are dynamic information stored in the upstream network device corresponding to the out-migration location of the virtual machine;
wherein the upstream network device corresponding to the out-migration location of the virtual machine is a network device that is between the first server from which the virtual machine is migrating and a first gateway; and
wherein the upstream network device corresponding to the in-migration location of the virtual machine is a network device that is between a second server to which the virtual machine is migrating and a second gateway.

7. The method according to claim 6, wherein the sending the virtual machine parameter migration message comprises:
sending the virtual machine parameter migration message to a migration management apparatus, so that the migration management apparatus initiates migration of virtual machine parameters at the not-running stage of the virtual machine.

8. The method according to claim 6, wherein the sending the virtual machine parameter migration message comprises:
sending, by the first server at the out-migration location of the virtual machine, the virtual machine parameter migration message to the upstream network device corresponding to the out-migration location of the virtual machine at the not-running stage of the virtual machine, so that the upstream network device corresponding to the out-migration location of the virtual machine sends virtual machine parameters to a virtual machine parameter management apparatus.

9. A migration management apparatus for migrating virtual machine parameters, comprising:
a memory configured to store program instructions;
a processor coupled to the memory and configured to read the program instructions stored in the memory, and execute the program instructions to:
receive a virtual machine parameter migration message, from a first server at an out-migration location of a virtual machine, at a not-running stage of the virtual machine; and
migrate virtual machine parameters according to the virtual machine parameter migration message by causing an upstream network device corresponding to the out-migration location of the virtual machine to migrate the virtual machine parameters of the virtual machine at the not-running stage of the virtual machine, so that the virtual machine parameters of the virtual machine stored in the upstream network device corresponding to the out-migration location of the virtual machine are migrated to an upstream network device corresponding to an in-migration location of the virtual machine;
wherein the virtual machine parameter migration message comprises an identifier of the virtual machine;
wherein the virtual machine parameters are dynamic information stored in the upstream network device corresponding to the out-migration location of the virtual machine;
wherein the upstream network device corresponding to the out-migration location of the virtual machine is a network device that is between the first server from which the virtual machine is migrating and a first gateway; and
wherein the upstream network device corresponding to the in-migration location of the virtual machine is a network device that is between a second server to which the virtual machine is migrating and a second gateway.

10. The apparatus according to claim 9, wherein the processor is further configured to execute the program instructions to initiate migration of virtual machine parameters at the not-running stage of the virtual machine.

11. The apparatus according to claim 10, wherein when initiating migration of virtual machine parameters at the not-running stage of the virtual machine, the processor is configured to execute the program instructions to perform one of the following:
- acquire virtual machine parameters of the upstream network device corresponding to the out-migration location of the virtual machine, and send the acquired virtual machine parameters to an upstream network device at an in-migration location of the virtual machine;
- send a virtual machine parameter acquisition message to the upstream network device at the in-migration location of the virtual machine, wherein the virtual machine parameter acquisition message comprises the identifier of the virtual machine and an identifier of the upstream network device corresponding to the out-migration location of the virtual machine, and the virtual machine parameter acquisition message is used to cause the upstream network device corresponding to the in-migration location of the virtual machine to acquire virtual machine parameters of the upstream network device corresponding to the out-migration location according to the identifier of the virtual machine and the identifier of the upstream network device corresponding to the out-migration location; and
- sends a virtual machine parameter push message to the upstream network device corresponding to the out-migration location of the virtual machine, wherein the virtual machine parameter push message comprises the identifier of the virtual machine and an identifier of a upstream network device corresponding to the in-migration location of the virtual machine, and the virtual machine parameter push message is used to cause the upstream network device corresponding to the out-migration location of the virtual machine to push virtual machine parameters to the upstream network device corresponding to the in-migration location according to the identifier of the virtual machine and the identifier of the upstream network device corresponding to the in-migration location.

12. A network device for migrating virtual machine parameters, wherein the network device is located on an upstream path of a virtual machine, and comprising:
- a memory configured to store program instructions;
- a processor coupled to the memory and configured to read the program instructions stored in the memory, and execute the program instructions to:
  - receive a virtual machine parameter migration message at a not-running stage of the virtual machine, wherein the virtual machine parameter migration message comprises an identifier of the virtual machine and a virtual machine parameter migration indication, wherein the virtual machine parameter migration indication is used to instruct the network device to migrate virtual machine parameters at the not-running stage of the virtual machine and used to indicate a migration state of the virtual machine, so that the virtual machine parameters of the virtual machine stored in an upstream network device corresponding to an out-migration location of the virtual machine are migrated to an upstream network device corresponding to an in-migration location of the virtual machine; wherein the migration state comprises in-migration and out-migration; and
  - migrate virtual machine parameters according to the virtual machine parameter migration message;
  - wherein the virtual machine parameters are dynamic information stored in the upstream network device corresponding to the out-migration location of the virtual machine;
  - wherein the upstream network device corresponding to the out-migration location of the virtual machine is a network device that is between a first server from which the virtual machine is migrating and a first gateway; and
  - wherein the upstream network device corresponding to the in-migration location of the virtual machine is a network device that is between a second server to which the virtual machine is migrating and a second gateway.

13. The network device according to claim 12, processor is further configured to execute the instructions to:
- send virtual machine parameters to a virtual machine parameter management apparatus when the virtual machine parameter migration indication indicates that the migration state is out-migration; and
- acquire virtual machine parameters from the virtual machine parameter management apparatus when the virtual machine parameter migration indication indicates that the migration state is in-migration.

* * * * *